United States Patent [19]
Croce et al.

[11] 3,715,390
[45] Feb. 6, 1973

[54] PROMOTION OF THE OXIDATION OF MONONUCLEAR AROMATIC COMPOUNDS

[75] Inventors: Louis J. Croce, Seabrook, Tex.; Bruno J. Barone, Houston, Tex.

[73] Assignee: Petro-Tex Chemical Corporation, Houston, Tex.

[22] Filed: June 2, 1971

[21] Appl. No.: 149,383

Related U.S. Application Data

[62] Division of Ser. No. 755,775, Aug. 28, 1968.

[52] U.S. Cl. .........................260/523 A, 260/524 R
[51] Int. Cl. .........................C07c 51/26, C07c 63/02
[58] Field of Search ......................260/524 R, 523 A

[56] References Cited

UNITED STATES PATENTS 2,245,528   6/1941   Loder.................................260/524

Primary Examiner—Lorraine A. Weinberger
Assistant Examiner—R. S. Weissberg
Attorney—G. Baxter Dunaway

[57] ABSTRACT

A process for the oxidation of mononuclear aromatic compounds having at least one oxidizable group selected from methyl, hydroxymethyl, and aldehyde, at moderate temperatures, and in the presence of oxygen, cobaltous or cobaltic ions, and an effective amount of a specified substituted acid function.

5 Claims, No Drawings

PROMOTION OF THE OXIDATION OF MONONUCLEAR AROMATIC COMPOUNDS

CROSS REFERENCES

This application is a division of application Ser. No. 755,775 filed Aug. 28, 1968.

BACKGROUND OF THE INVENTION

This invention relates to an improved method for the oxidation of aromatic compounds characterized by a single aryl group having at least one oxidizable group selected from methyl, hydroxymethyl and aldehyde. More particularly, the invention relates to an improved process for the efficient and economical conversion of suitable methyl and dimethyl substituted monoaryl compounds to aromatic monobasic and dibasic acids.

Previous studies in this field have evolved a variety of proposed processes for the catalytic liquid phase oxidation of alkylation aromatic compounds in the presence or absence of a solvent by means of air or oxygen using various metals or salts thereof as catalysts. A variety of organic compounds such as peroxides, aldehydes, and ketones, have been proposed and utilized as reaction initiators or activators, and at least one commercial process employs bromine or bromides as catalytic aids.

The present invention has for its principle object the provision of a novel process for the economical and efficient oxidation of aromatic compounds to products such as toluic acid, terephthalic acid and other compounds. A further object is to provide a method whereby methyl and dimethyl substituted benzenes may be directly oxidized to the desired products without the necessity of separate intermediate steps. Additional objects include the provision of such a process which yields directly products of high purity or having a small content of readily separable impurities, and which involves reaction conditions that are operable at low cost and readily controlled.

The above and other objects are accomplished in accordance with this invention by carrying out the reaction with the materials and the operating conditions hereinafter described. All parts are by weight unless specified otherwise.

SUMMARY OF THE INVENTION

Broadly, the invention comprises reacting a monoaryl compound containing at least one oxidizable group selected from methyl, hydroxymethyl, and aldehyde with oxygen in an inert medium or solvent at a temperature of from about 60°C to about 160°C at atmospheric pressure or greater, and in the presence of a catalytically active or effective amount of cobaltous ion, cobaltic ion, or mixtures thereof, and effective amounts, as more particularly hereinafter described, of specified acid function promoters. More particularly the invention comprises a process for the oxidation of compounds of the type described in an inert medium or solvent at a temperature of from about 60°C to about 150°C at atmospheric pressure or greater, and in the presence of from about 0.3 to 24 grams per liter cobaltous or cobaltic ion, or mixtures thereof, and an effective amount of certain organic acid function promoters.

DETAILED DESCRIPTION OF THE INVENTION

In its preferred form the invention comprises a process for the oxidation of methyl or dimethyl substituted monoaryl compounds in an inert medium or solvent with oxygen at a temperature of from about 60°C to about 150°C at atmospheric pressure or greater, and in the presence of from 0.3 to 24 grams per liter cobaltous or cobaltic ion, or mixtures thereof, and from about 0.0002 mols per liter to about 0.09 mols per liter of specified organic acid function promoters, defined more particularly hereinafter.

It has been found that certain organic materials are beneficial and promote or regulate the oxidation so that better yields or shorter reaction times, or both, are obtained. These promoters or regulators may be described generally as specified organic acid function

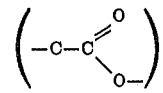

containing compounds such as compounds which are or which contain a hydroxy-, cyano-, methylenic keto-, methylenic thiono, or thiol-substituted monobasic aliphatic acid function containing two to 12 carbon atoms, compounds which are or contain an unsubstituted or substituted dicarboxylic cycloaliphatic acid function containing five to nine carbon atoms, wherein the carboxyl groups are spaced not further than two carbon atoms from each other on the cyclic structure, compounds which are or which contain an unsubstituted or substituted dibasic and tribasic aliphatic acid function containing two to 12 carbon atoms, and compounds which provide or yield the said substituted monobasic aliphatic, dibasic cycloaliphatic, dibasic aliphatic and tribasic aliphatic acid functions in solution, by solubility, or reaction, such as by hydrolysis or oxidation and which do not interfere with the oxidation system. More particularly, these compounds may be described as hydroxy-substituted, methylenic keto-, methylenic thiono-, cyano-, and thiol-substituted monobasic aliphatic acids of two to 12 carbon atoms, and their precursors and derivatives which yield the acid function in solution by solubility or reaction, such as by hydrolysis or oxidation; substituted and unsubstituted dibasic cycloaliphatic acids containing five to nine carbon atoms, wherein the carboxyl groups are spaced not further than two carbon atoms from each other on the cyclic structure, and their precursors and derivatives which yield the acid function in solution, by solubility or reaction; and substituted and unsubstituted dibasic and tribasic aliphatic acids containing two to 12 carbon atoms, and their precursors and derivatives which yield the said functions in solution by the mechanisms indicated. Thus, what is required is the presence, at some point during the reaction, of the aliphatic or cycloaliphatic acid function of two to 12 carbon atoms, substituted in the manner indicated with respect to the monobasic acid function, substituted or unsubstituted in relation to the cycloaliphatic monobasic and dibasic acid functions, the substituted or unsubstituted in relation to the dibasic and tribasic aliphatic acid functions. In the present specification and claims the term "aliphatic" is understood to mean "acyclicaliphatic' and has been used interchangeably therewith and as such the terms "aliphatic" and "cycloaliphatic" are taken to be mutually exclusive, except to the extent that a cycloaliphatic group might possess given "aliphatic" groupings. The term "aliphatic" or "acyclicaliphatic" is not limited to carbon and hydrogen content, but includes the presence of elements and groups such as halogens (—COOH), (—OH),

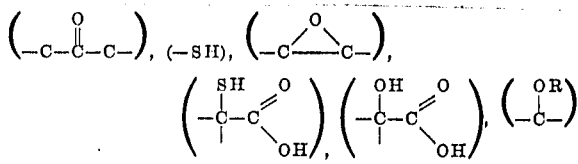

etc. The phrase as used in the present specification and claims "but does not include a carboxyl group, or precursor or derivative thereof" is understood to mean that the radical or group in point does not contain oxygen. The term "substituted," where not preceded by language specifying particular groupings, is used to denote the presence of substituents other than C and H in the acid function, such as Cl, Br, I, S, O, etc., and also includes the presence of unsaturated moieties. The acid function may be present in the system in either the molecular or ionized form or both, and mixtures of various acid, precursors and derivatives may be used to supply the acid function. The acid functions may be supplied, e.g., in the form of acids, inorganic or organic salts, esters, anhydrides or lactones. It is understood, of course, as indicated above, that the acid function should be supplied in the form of compounds which do not of themselves contain or react to form oxidation inhibiting or interfering materials. Thus, for example the acid function salts or Cr, V and Cu should not be employed.

A preferred grouping of compounds are those which are or which yield carboxylic acid functions containing two to 12 carbon atoms of the type indicated and which have the general formula $$AD_dQ$$

wherein
A is selected from (—COOZ), (—CHO) or (—C ≡ N), and Z is selected from the group consisting of H; non-oxidation interfering inorganic and organic cationic groupings; and ester forming moieties containing one to 20 carbon atoms; $d$ is 0 or 1; Q is selected from (—COOZ) wherein Z is as above indicated; (—CHO); (—C ≡ N); (—C=XCH$_3$) wherein X is O or S;

wherein R is H or (—CH$_3$), and wherein X is O or S; and D represents an aliphatic group of one to 10 carbon atoms or a non-carboxylic acid containing cycloaliphatic group of three to seven carbon atoms, such that A and Q, when bonded to said cycloaliphatic structure, are spaced not further than two carbon atoms from each other on the cyclic structure.

As may be seen, a wide variety of acids and their precursors and derivatives may be employed. The moiety D may include such groupings, e.g., as (—CYR$_x$—)$_y$ wherein Y is H or a member selected from the group consisting of Cl, Br, or I; R is H, (—CH$_2$—), and (—CH$_2$R'$_x$—) wherein R' is an aliphatic group containing one to 10 carbon atoms, $x$ is 1, $y$ is from 1 to 10, and $z$ is 0 or 1; (—RC:CR—) wherein R is H, (—CH$_2$—), or (—CH$_2$R'$_x$—), and wherein R' is an aliphatic group containing one to eight carbon atoms, and $x$ is 0 or 1;

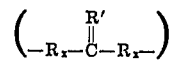

wherein R is an aliphatic group of one to eight carbon atoms, R' is (=CHR''') wherein R''' is H or an aliphatic group of one to six carbon atoms and $x$ is 0 or 1; (—R$_x$·CH·XR'·R$_x$—)$_y$ wherein X is O or S, R is an aliphatic group of one to nine carbon atoms, and may include the group (—CH·XR'—); R' is H or an alkyl group of one to four carbon atoms; and $x$ is 0 or 1; $y$ is a whole number from 1 to 3; (—RC=O R—) wherein R is an aliphatic group containing one to eight carbon atoms; (—R$_x$—CXHAR$_x$—) wherein R is an aliphatic group having one to eight carbon atoms, X is O or S, and $x$ is 0 or 1, and A is as indicated above;

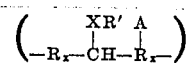

wherein R is an aliphatic group of one to eight carbon atoms, X is O or S, R' is an alkyl group of one to four carbon atoms, and $x$ is 0 or 1; and A is as indicated above

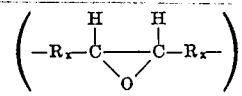

wherein R is an aliphatic group containing one to nine carbon atoms, and $x$ is 0 or 1;

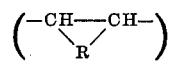

wherein R is an aliphatic group containing one to five carbon atoms;

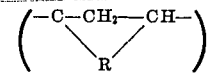

wherein R is an aliphatic group containing one to four carbon atoms, are suitable for use in the present invention. As will be apparent to those of skill in the art, this formula includes many precursors and derivatives of certain monobasic, dibasic, and tribasic aliphatic and cycloaliphatic acids from which the acid function may be obtained during the course of the reaction under the conditions of the system, either by reaction or solubility. Included under this general formula are the saturated dibasic aliphatic acids and their precursors and derivatives. These acids and their precursors and derivatives have the formula A' (—CYR$_x$—)$_y$Q', wherein Y is H or Cl, Br, or I; R is H, (—CH$_2$—), or (—CH$_2$R'$_x$—) wherein R' is an aliphatic group containing one to 10 carbon atoms, with the provision that R' does not include a carboxyl group or precursor or derivative thereof, x is 1, y is from 0 to 10, and z is 0 or 1; A' and Q' are selected from —COOZ, —CHO, and C ≡ N, wherein Z is as above indicated and x is a whole number from 0 to 10. The saturated acids per se may be described by the formula HOOC(—R—)$_n$COOH, wherein R is alkyl of one to 10 carbon atoms, and n is from 0 to 1. Suitable acids of this type include oxalic acid, malonic acid, succinic acid, glutaric acid, adipic acid, pimelic acid, suberic acid, azelaic acid, sebacic acid, undecanedioic acid, dodecanedioic acid.

Unsaturated dibasic acids and their precursors and derivatives which are suitable for use in the present invention include those of the formula A'(—RC:CR—)Q', wherein A' and Q' are as indicated above, R is H, (—CH$_2$—), or (—CH$_2$R'$_x$—) wherein R' is an aliphatic group containing one to eight carbon atoms, and may include one or more —CH:CH— groups, but not a carboxyl group, or precursor or derivative thereof and x is 0 or 1. Additionally, the unsaturated acids described by the formula

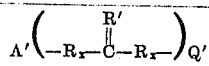

wherein A' and Q' are as indicated above, R is an aliphatic group of one to eight carbon atoms, but does not contain a carboxyl group or precursor or derivative thereof, x is 0 or 1, and R' is (=CHR'')wherein R'' is H or an aliphatic group containing one to six carbon atoms but does not contain a carboxyl group or precursor or derivative thereof, may be used. These acids are more particularly described by the formula HOOC(—RC:CR—) COOH, wherein R and x are as above indicated, and

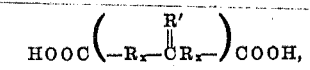

wherein R, R', and x are as above indicated. Acids included in this group include maleic acid, fumaric acid, citraconic acid, mesaconic acid, itaconic acid, ethylmaleic acid, xeronic acid, glutaconic acid, and muconic acid.

Hydroxy, alkoxy of one to four carbon atoms, and thiol dibasic aliphatic acids of 3 to 12 carbon atoms and their precursors and derivatives may be employed within the process of the invention. Many of these materials correspond to the formula A'(—R$_x$·CH·XR'·R$_x$—)$_y$ Q' wherein A' and Q' are as above indicated, X is O or S, R is an aliphatic group of one to seven carbon atoms which may include the group —CH·XR' but not a carboxyl group or precursor or derivative thereof, R' is H or an alkyl group of one to four carbon atoms, x is 0 or 1, and y is a whole number from 1 to 4. The acids may be described by the formula HOOC(-R$_x$CHD·XH-)$_y$COOH wherein R, x, X, and y have the meaning indicated above. Acids conforming to this designation include tartronic acid, malic acid, tartaric acid, trihydroxyglutaric acid, and tetrahydroxyadipic acid.

Dibasic ketonic acids and their precursors and derivatives may also be used. These materials correspond to the general formula A'(—RC:OR—)$_x$Q' wherein A' and Q' are as above, R is an aliphatic group containing one to eight carbon atoms but does not include a carboxyl group, or precursor or derivative thereof, and x is a whole number from 1 to 3. Included within this group of materials are mesoxalic acid, oxaloacetic acid, acetone dicarboxylic acid, β,β-trimethylketoglutaric acid, and 1-heptene-3-one-1, 5 dicarboxylic acid.

As indicated, certain substituted monobasic aliphatic acids containing two to 12 carbon atoms, and their precursors and derivatives may be used according to the invention. These compounds correspond generally to the formula A'D Q wherein
A' is as indicated above;
D is selected from (—CHR—)$_x$, wherein R is H or aliphatic of one to 11 carbon atoms but does not include a carboxyl group or precursor or derivative thereof, and x is from 1 to 11;

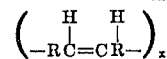

wherein R is selected from H, —CH$_2$—, and (—CH$_2$R''—) wherein R'' is an aliphatic group containing 1 to 8 carbon atoms, but does not include a carboxyl group or precursor or derivative thereof, x is from 1 to 5;

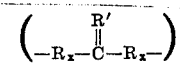

wherein R is an aliphatic group of one to eight carbon atoms, R' is (=CHR''') wherein R''' is H or an aliphatic group of one to six carbon atoms, and x is 0 or 1;

wherein R is (—CH$_2$) or (—CH$_2$R'—), wherein R' is an aliphatic group of one to eight carbon atoms, but does not contain a carboxyl group or precursor or derivative thereof, x is 0 or 1, X is O or S; and R'' is alkyl of one to six carbon atoms;

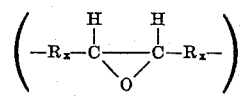

Q is OH, SH, (—C=X·$^{CH}$$_3$), and

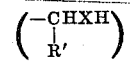

wherein R' is H or (—CH$_3$) and X is O or S. Acids which correspond to this grouping include glycolic acid, β-lactic acid, 4 hydroxybutanoic acid, and mercaptoacetic acid.

Also included within the scope of the invention are the tribasic aliphatic acids of 1 to 12 carbon atoms and their precursors and reversible derivatives. These materials have the general formula A'DQ' wherein A' is as indicated above, Q' represents —COOZ or —

CHO, or C ≡ N, and D represents ($-R_x \cdot CHA' \cdot R_x-$) wherein R is an aliphatic group containing one to eight carbon atoms, but does not contain a carboxyl group or precursor or derivative thereof, Z is as indicated above and $x$ is a whole number from 0 to 1. Similarly, the hydroxy and thiol substituted tribasic aliphatic acids of five to 12 carbon atoms wherein D represents ($-R_x \cdot CHCXHA' \cdot R_x-$) or

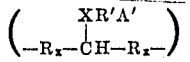

wherein R is an aliphatic group containing one to eight carbon atoms, but does not contain a carboxyl group or precursor or derivative thereof, X is O or S, A' is as above indicated, R' is an alkyl group of one to four carbon atoms, and $x$ is a whole number from 0 to 1, may be used. Representative of these classes of materials are tricarballylic acid, carboxymethylthiosuccinic acid, citric acid, cis-Aconitic acid, oxalo succinic acid, and butene 1,1,3-tricarboxylic acid.

Additional miscellaneous aliphatic acids and their precursors and derivatives include those having the general formula ADQ wherein D represents

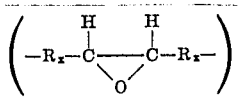

wherein R is an aliphatic group containing one to eight carbon atoms, and $x$ is 0 or 1. Examples of this type of material which may be used include glycidic acid, and epicyanohydrin.

As noted, the monobasic and dibasic cycloaliphatic acids wherein the carboxyl groups are spaced not further than two carbon atoms from each other on the cyclic structure, and their precursors and derivatives may be used. These compounds have the general formula ADQ wherein A and Q are as above indicated, and D represents

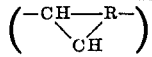

wherein R is an aliphatic group of one to five carbon atoms, but does not include a carboxyl group or its precursors or derivatives and

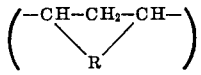

wherein R is an aliphatic group containing one to four carbon atoms but does not include a carboxyl group or its precursors or derivatives. Representative acid functions from this group include cyclopropanedicarboxylic acid, and 1,3 cyclohexyldicarboxylic acid.

As has been noted, the acid function employed may be supplied in a wide variety of forms other than the free acid, the only limitation being as indicated, that the compound supplying the form does not contain oxidation interfering or inhibiting materials. Suitable examples of Z include metal ions such as those of metals selected from Groups Ia, IIa, IIIa, IIIb, IVa, Va, VIb, Nb, Ta, W; $NH_4^+$, and organic ammonium ions from amines such as primary lower alkyl amines, secondary lower aklyl amines, tertiary lower alkyl amines, hydroxy primary lower alkyl amines, hydroxy secondary lower alkyl amines, hydroxy tertiary lower alkyl amines, and heterocyclic amines including pyridines, quinolines, isoquinolines, pyrazines, pyrolles, and pyrimidines; and ester forming moieties such as $-CH_2-R$, wherein R is H or an aliphatic group containing one to 20 carbon atoms. The preferred salts are those of Groups Ia and IIa, the preferred amines are the primary, secondary, and tertiary lower alkyl amines, and preferred esters are those of aliphatic alcohols containing one to 10 carbon atoms.

The amount of the promoter employed may be varied to some extent except that sufficient amounts, i.e., effective amounts, must be employed to promote the oxidation and give the improved results. Suitable amounts range from about 0.0002 mol of promoter per mol of aromatic hydrocarbon to about 0.09 mol of promoter per mol of aromatic hydrocarbon. A preferred range of promoter is from about 0.0009 mol of promoter per mol of aromatic hydrocarbon to about 0.05 mol of promoter per mol of aromatic hydrocarbon.

The point of addition of the promoter during the course of the reaction may be varied considerably. For example, the promoter, or a portion thereof, may be present initially with the reactants or portions thereof, or the promoter may be added incrementally during the course of the reaction. The promoter or major portion thereof, may be added, as a preferred feature, during the course of the reaction when the reaction experiences its maximum rate of oxidation or oxygen uptake. For example, from about one-tenth to about six-tenths of the amount of the promoter may be used at the beginning of the reaction, and then the balance added during the period of maximum oxygen uptake, or one-tenth to four-tenths of the amount of promoter may be added initially, with the balance being added during maximum absorption.

As may be seen, the process of the invention is applicable to a wide variety of materials. Typical starting materials include toluene, p-xylene, m-xylene, hydroxymethyl benzene (benzyl alcohol) and benzaldehyde, or mixtures containing such compounds. The aromatic starting material may contain, in addition to the specified group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, and isophthalic aldehyde to isophthalic acid. Although no particular concentrations of the monoaryl compound are required, in practice concentrations of from about 0.3 mol per liter to about 3.5 mols per liter, based on the total amount of solution present, are suitable. Concentrations from about 0.8 to about 3.0 mols per liter are preferred.

As noted above, either cobaltous or cobaltic ion (or both) should be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Preferably the minimum amount of cobaltous or cobaltic ion is 1.0 gram per liter. Thus with the use of a 1 molar solution of the starting aromatic compound in acetic acid, the desired cobalt concentration may be supplied by the initial provision of about 0.03 to 0.20 mol of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mol per liter of the monocarboxylic acid media, more particularly hereinafter described, in order to reduce the induction period and to insure complete solubility of the cobalt compound. Water need not be used with the acetylacetonates. The water may be introduced directly or by use of hydrated materials.

Suitable temperatures for the oxidation process in accordance with this invention are within the range of 60°C to about 135°C at atmospheric pressure, although temperatures up to about 160°C may at times be used, with somewhat higher pressures up to about 50 atmospheres or greater. The preferred operating temperatures are from about 80°C to about 130°C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

The reaction is carried out in a suitable solvent or medium which is inert to the reactants, promoter, or products under the oxidative conditions of the process, or is carried out in a solvent or medium which may be oxidized by the system to materials inert to the reactants or products. Preferred media for carrying out the reaction under the conditions set forth as described above, are the monocarboxylic acids selected from the group consisting of alkanoic acids having two to six carbon atoms, mixtures thereof, and aryl aliphatic acids having from eight to 12 carbon atoms, and mixtures thereof. Acetic acid is preferred, although such media as propionic, butyric, trimethyl acetic, and phenyl acetic, and the like, may be used.

Although not required, prior art catalytic aids and "initiators," may be employed to aid in the attack on the hydrocarbon molecule, especially at lower temperatures. The preferred prior art initiators are aldehydes and ketones such as paraldehyde, acetaldehyde, and methyl ethyl ketone. In general, aldehydes and ketones of three to 10 carbon atoms are suitable. The aldehydes, propionaldehyde, tolualdehyde, and the ketones diethyl ketone, methyl propyl ketone, and 2,5 hexanedione are particularly effective. These initiators, when utilized, are present at the beginning of the reaction or is added incrementally in a total amount from about 0.01 to about 0.5 mol per liter of solution. The initiators may also be added after the fashion described in U.S. application Ser. No. 617,803, to Barone, filed Feb. 23, 1967, wherein the initiator, or the major portion thereof, is added during the period in the course of the reaction that the reaction experiences its maximum rate of oxidation or oxygen uptake.

Certain metallic elements are effective in additionally improving the yields and/or rates of the reaction. In general, the metals of the Periodic Table having a valence greater than 1+, but having only a single valence or primary oxidation state, are effective in accomplishing increased yields and faster reaction rates. Exemplary are Be, Mn, Mg, Ca, Sr, Ba, Sc, Y, La, Zr, Hf, Ac, Ta, Mo, W, Ru, Rh, Cd, Zn, B, Al, Ga, In, Nd, Pr, Gd, Tb, and Th and mixtures thereof. In addition to Ta, one other element of Group Vb, i.e., Nb, and mixtures of Nb and Ta, show activity.[1] This group is based on the Periodic Table as found on pages 400-401 of the Handbook of Chemistry and Physics, 39th (1957-58) Edition, Chemical Rubber Publishing Company. Especially effective are Al, Zr, La, Nd, Th, Zn, B, Mo and Nb. These elements, or mixtures thereof, may be in the form of inorganic and organic salts, oxides, hydroxides and complexes, the only requirement being that sufficient amounts of the specified elements be present to provide a catalytic or effective amount of ions in the solution during the course of the reaction. For example, the metal ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates and butyrates. The metals having a single or primary valence greater than 1+ should be present in amount of from 0.05 to 9.5 grams per liter. A preferred amount is from 0.05 to 4.9 grams per liter. The concentrations of the metals of Group Vb, other than tantalum, may be substantially less, e.g., on the order of 0.01 gram per liter to 1.75 grams per liter. In particular, effective results are obtained with niobium at a concentration of from 0.01 gram per liter to 1.0 gram per liter.

The following, non-limiting examples illustrate the effectiveness and efficiency of the invention.

EXAMPLE 1

As a control, 21.2 grams p-xylene, 180.0 grams acetic acid, 5.0 grams cobalt acetate · tetrahydrate were charged into a reactor provided with suitably valved gas inlet and outlet lines for admission of oxygen. The relative concentrations were thus approximately one mol p-xylene per liter of acetic acid solution and 0.1 mol cobalt acetate · tetrahydrate per liter of acetic acid solution. The temperature of the reactor was held at about 100° C. and the reaction was carried out under atmospheric pressure at a stirring rate of approximately 1000 rpm. As a matter of convenience, the reaction was carried out for slightly over 23 hours, although it was clear that the bulk of the oxidation had been completed long before the end of this time. The amount of p-xylene oxidized was approximately 100 per cent of that employed, and gave a terephthalic acid yield of 54.8 per cent. The yield of p-toluic acid was approximately 44.9 per cent.

EXAMPLE 2

The procedure of Example 1 was repeated utilizing 0.0025 mol oxalic acid dihydrate per mol of p-xylene. Results indicated about 100 per cent conversion of the p-xylene and approximate yields of 60.3 per cent terephthalic acid and 38.7 per cent p-toluic acid respectively.

EXAMPLE 3

The procedure of Example 1 was repeated except that 0.0050 mol of succinic acid was added per mol of p-xylene. The conversion of p-xylene was about 100 per cent for a terephthalic acid yield of 58.5 per cent and a yield of p-toluic acid of 40.4 per cent.

EXAMPLE 4

The procedure of Example 1 was repeated except that 0.0025 mol of sebacic acid per mol of p-xylene was employed. Analysis indicated a yield of 57.9 per cent terephthalic acid and 41.1 per cent p-toluic acid, the conversion rate being approximately 100 per cent.

EXAMPLE 5

The procedure of Example 1 was repeated except that 0.0025 mol maleic acid per mol of p-xylene was employed. The conversion of p-xylene was approximately 100 per cent and a yield of terephthalic acid of 57.0 per cent with 41.9 per cent p-toluic acid being formed was obtained.

EXAMPLE 6

The procedure of Example 1 was repeated utilizing 0.0025 mol of maleic anhydride per mol of p-xylene. Results showed approximately 100 per cent of the p-xylene was consumed to give yields of 58.8 per cent terephthalic acid and 40.1 per cent p-toluic acid respectively.

EXAMPLE 7

The procedure of Example 1 was repeated employing 0.0025 mol itaconic acid per mol of p-xylene. The conversion of p-xylene was approximately 100 per cent for a terephthalic acid yield of 56.7 per cent and a p-toluic acid yield of 42.8 per cent.

EXAMPLE 8

The procedure of Example 1 was repeated except that 0.005 mol glyoxal per mol of p-xylene was added to the reaction mixture. On analysis the conversion of p-xylene was shown to be approximately 100 per cent and yields of 58.5 per cent terephthalic acid and 40.4 per cent p-toluic acid respectively were obtained.

EXAMPLE 9

The procedure of Example 1 was repeated except that 0.00125 mol glyoxal (trimer) per mol of p-xylene was employed. Results indicated 100 per cent of the p-xylene was consumed to give yields of 58.2 per cent terephthalic acid and 41.3 per cent p-toluic acid respectively.

EXAMPLE 10

Example 1 was repeated utilizing 0.005 mol tartaric acid per mol of p-xylene. The yield of terephthalic acid was approximately 59.1 per cent and the yield of p-toluic acid was 39.6 per cent.

EXAMPLE 11

The procedure of Example 1 was repeated except that 0.00125 mol citric acid per mol of p-xylene was employed. Conversion of p-xylene was approximately 100 per cent for a terephthalic acid yield of 59.1 per cent and a p-toluic acid yield of 39.8 per cent.

EXAMPLE 12

Example 1 was repeated except that 0.0025 mol glycolic acid per mol of p-xylene was added to the reaction mixture. A conversion rate of approximately 100 per cent was obtained, with a terephthalic acid yield of 58.5 per cent and a p-toluic acid yield of 40.4 per cent being obtained.

EXAMPLE 13

The procedure of Example 1 was repeated utilizing 0.0025 mol lactic acid per mol of p-xylene. Results indicated approximately 100 per cent conversion of the p-xylene and yields of 58.8 per cent terephthalic acid and 40.0 per cent p-toluic acid respectively.

EXAMPLE 14

The procedure of Example 1 was repeated except that 0.0085 mol mercaptoacetic acid per mol of p-xylene was utilized. The conversion of p-xylene was approximately 100 per cent for a terephthalic acid yield of 59.4 per cent and a p-toluic acid yield of 39.7 per cent.

EXAMPLE 15

The procedure of Example 1 was repeated utilizing 0.00125 mol carboxymethylthiosuccinic acid per mol of p-xylene. The results indicated approximately 100 per cent conversion of the p-xylene for a yield of 57.3 per cent terephthalic acid and 42.2 per cent p-toluic acid.

EXAMPLE 16

The procedure of this example is similar to that of Example 1 except that the temperature was raised to approximately 120°, the pressure was increased to about 34 atmospheres, approximately 0.3 mol of cobalt acetate · tetrahydrate per liter of acetic acid solution was employed, and reaction time was reduced to about 4 hours. The addition of the reactants was varied somewhat in that four-fifths of the acetic acid and one-half of the p-xylene were added along with all of the catalyst and reacted until initiation of the reaction, and then the remaining acetic acid and p-xylene were added over a sixty-minute period during the maximum oxygen absorption. The conversion of p-xylene was approximately 96.5 per cent for a terephthalic acid yield of 65.9 per cent and a p-toluic acid yield of 23.3 per cent.

EXAMPLE 17

The procedure of Example 16 was repeated except that 0.0025 mol oxalic acid per mol of p-xylene was added initially and 0.0025 mol oxalic acid per mol p-xylene was added along with the remaining solution during the period of maximum oxygen absorption. The conversion of p-xylene was approximately 96.4 per cent with a terephthalic acid yield of 81.8 per cent and a p-toluic acid yield of 13.3 per cent.

EXAMPLE 18

The procedure of Example 16 was repeated except that 0.005 mol glycolic acid per mol p-xylene was added initially with the reaction mixture and 0.005 mol glycolic acid per mol p-xylene was added during the period of maximum oxygen absorption. The conversion was at a rate of approximately 100 per cent, and the yield of terephthalic acid was 87.0 per cent, the yield of p-toluic acid being approximately 7.0 per cent.

EXAMPLE 19

The procedure of this example was similar to that of Example 1 except that the reaction was initiated at a temperature of 125° C and allowed to rise, due to the exothermal nature of the reaction, to a temperature of about 130° C., where it was held for the remainder of the reaction time. The pressure was increased to approximately 34 atmospheres, the stirring rate was around 1200 rpm and the reaction time was decreased to about 4 hours. In this example the concentration of the p-xylene was 2.5 mol of p-xylene per liter of acetic acid solution, and the concentration of the cobalt acetate·tetrahydrate was 0.375 mol of cobalt acetate·tetrahydrate per liter of acetic acid solution. The addition of the reactants was also varied in that nine-tenths of the acetic acid, all of the cobalt acetate·tetrahydrate, and one-eighth of the p-xylene to be converted were added to the reactor and reacted until initiation of the reaction. The remaining acetic acid and p-xylene were added over an eighty-minute period during maximum oxygen absorption. The conversion of p-xylene was approximately 97.1 per cent with a terephthalic acid yield of 83.3 per cent and a p-toluic acid yield of 12.9 per cent being obtained.

EXAMPLE 20

The procedure of Example 19 was repeated except that 0.0025 mol oxalic acid per mol of p-xylene was added initially to the reaction mixture and 0.0025 mol per mol was added during the period of maximum oxygen uptake. The yield of terephthalic acid was about 89.2 per cent and the yield of p-toluic acid was approximately 8.9 per cent. A conversion rate of approximately 97.2 per cent was obtained.

EXAMPLE 21

The procedure of Example 19 was repeated except that 0.0025 mol glycolic acid per mol of p-xylene was added initially to the reaction mixture. During the maximum oxygen absorption 0.0025 mol glycolic acid per mol p-xylene was added. Results indicated a conversion rate of approximately 96.5 per cent with a terephthalic acid yield of 90.2 per cent and a p-toluic acid yield of 6.1 per cent.

These examples demonstrate unequivocally the improved results obtained by the use of the novel promoters or regulators of the present invention. In every instance, under analogous conditions, the yield of terephthalic acid, the more desirable product, was improved.

The invention claimed is:

1. A process for oxidizing monoaryl compounds containing at least one member selected from the group consisting of a methyl group, a hydroxy methyl group and an aldehyde group, comprising contacting about 0.3 to about 3.5 mols per liter of said monoaryl compound with oxygen in an inert monocarboxylic acid solvent selected from the group consisting of alkanoic acids having two to six carbon atoms, aryl aliphatic acids having eight to 12 carbon atoms and mixtures thereof, and in the presence of a member selected from the group consisting of cobaltous ion, cobaltic ion and mixtures thereof and about 0.0002 to 0.09 mols per liter of a promoter of the formula

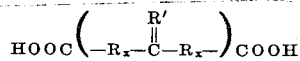

wherein R is an alkyl group of one to eight carbon atoms and R' is (=CHR''), R'' is hydrogen or an alkyl group containing one to six carbon atoms and $x$ is 0 or 1, said contacting being carried out at a temperature of from about 60°C to about 160°C and at atmospheric pressure or greater.

2. The process of claim 1 wherein a major portion of the promoter is added during the period of maximum oxygen uptake of the system.

3. The process of claim 1 wherein the promoter comprises itaconic acid, said promoter being present in an amount of from about 0.0009 mol of promoter per mol of aromatic hydrocarbon to about 0.05 mol of promoter per mol of aromatic hydrocarbon, and said cobaltous ion, cobaltic ion, and mixtures thereof being present in an amount of from about 1.0 gram per liter to about 24 grams per liter.

4. The process according to claim 1 wherein said contacting is carried out in the presence of an effective amount of a co-catalyst having a valence greater than 1+, but having only a single valence or primary oxidation state selected from the group consisting of Be, Mn, Mg, Ca, Sr, Ba, Sc, Y, La, Zr, Hf, Ac, Ta, Mo, W, Ru, Rh, Cd, Zn, B, Al, Ga, In, Nd, Pr, Gd, Tb, Th and mixtures thereof.

5. The process according to claim 1 wherein said contacting is carried out in the presence of an aldehyde or methylenic ketone having three to 10 carbon atoms.

* * * * *